(12) United States Patent
Herman

(10) Patent No.: US 7,206,444 B2
(45) Date of Patent: Apr. 17, 2007

(54) SYSTEM AND METHOD FOR LOCATING MULTIPLE PEAK SUMMITS IN THREE-DIMENSIONAL DATA

(75) Inventor: Carl R. Herman, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 753 days.

(21) Appl. No.: 10/213,416

(22) Filed: Aug. 6, 2002

(65) Prior Publication Data

US 2004/0028270 A1     Feb. 12, 2004

(51) Int. Cl.
*G06K 9/00* (2006.01)
(52) U.S. Cl. ..................................... 382/154
(58) Field of Classification Search ............... 382/154
See application file for complete search history.

(56) References Cited

U.S. PATENT DOCUMENTS

| | | | |
|---|---|---|---|
| 2,605,358 A * | 7/1952 | Neher | ..................... 330/187 |
| 3,408,485 A | 10/1968 | Scott et al. | |
| 3,946,361 A | 3/1976 | Cruttwell et al. | |
| 4,115,805 A | 9/1978 | Morton | |
| 4,183,013 A | 1/1980 | Agrawala et al. | |
| 4,658,368 A | 4/1987 | Blais | |
| 4,731,863 A | 3/1988 | Sezan et al. | |
| 4,819,197 A | 4/1989 | Blais | |
| 5,018,214 A | 5/1991 | Pasch | |
| 5,097,263 A | 3/1992 | Delpech et al. | |
| 5,319,583 A | 6/1994 | Wildes | |
| 5,402,337 A | 3/1995 | Nishide | |
| 5,493,208 A * | 2/1996 | Goto | ..................... 324/73.1 |
| 5,524,251 A | 6/1996 | Urasaki | |
| 5,559,904 A | 9/1996 | Holzmann | |
| 5,610,827 A | 3/1997 | Reilly | |
| 5,647,018 A * | 7/1997 | Benjamin | ..................... 382/128 |
| 5,978,502 A | 11/1999 | Ohashi | |

OTHER PUBLICATIONS

James Stewart, Calculus Early Transcendentals, 1995, Brooks/Cole Publishing Company, Third Edition, 792-799.*
Giorgio Rizzoni, Principles and Applications of Electrical Engineering, 1993, McGraw-Hill Companies, Inc., Third Edition, 238-245.*

* cited by examiner

*Primary Examiner*—Joseph Mancuso
*Assistant Examiner*—Jonathan Schaffer
(74) *Attorney, Agent, or Firm*—Tarolli, Sundheim, Covell & Tummino LLP

(57) ABSTRACT

A method for determining peak summit locations for multiple peaks on a three-dimensional contour includes the step of determining a highest point on the contour. Next, a peak summit of a peak on the contour is identified. The peak summit is related to the highest point on the contour. Next, the points on the contour associated with the peak on the contour are determined, and the contour is modified to zero out the points on the contour associated with the peak. The above steps are then repeated until all of the peak summits on the contour are identified.

18 Claims, 5 Drawing Sheets

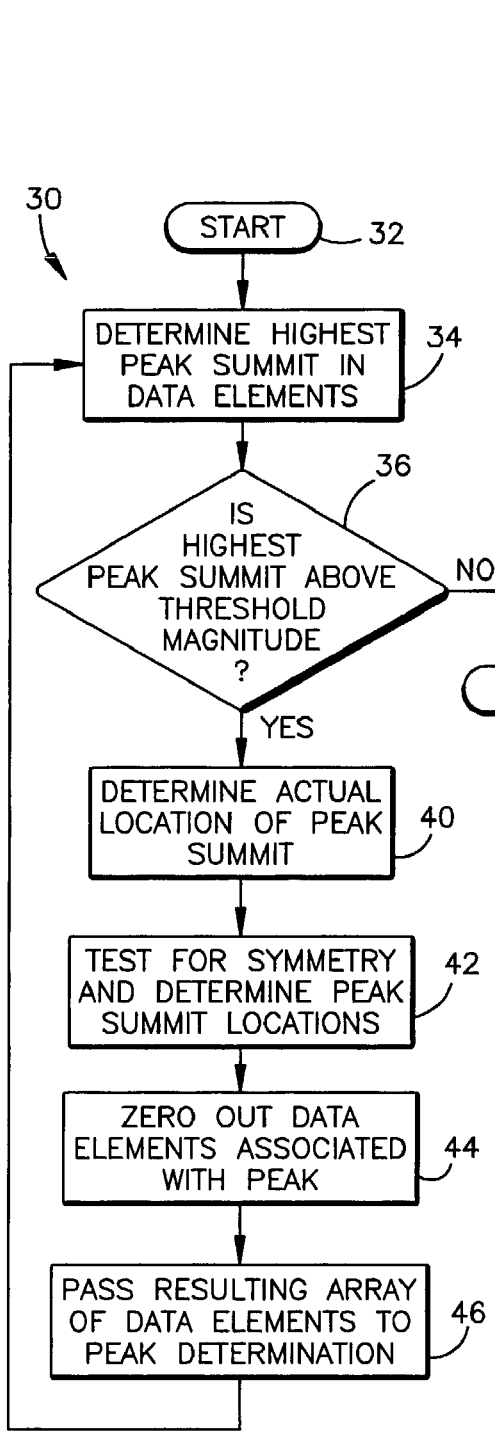
Fig.2
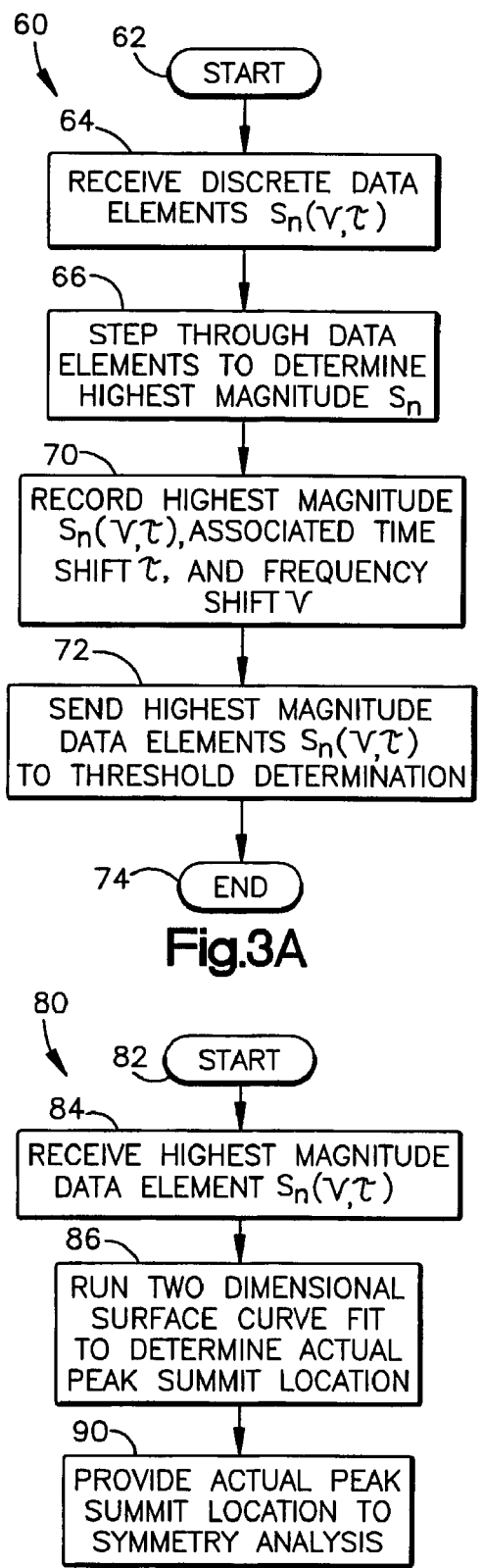
Fig.3A
Fig.3B

SYSTEM AND METHOD FOR LOCATING MULTIPLE PEAK SUMMITS IN THREE-DIMENSIONAL DATA

FIELD OF THE INVENTION

The present invention relates to a system and method for determining the location of multiple peak summits in three-dimensional data.

BACKGROUND OF THE INVENTION

There are a variety of applications that incorporate the use of three-dimensional data. In a non-discrete form, this three-dimensional data may be represented as a three dimensional contour that includes a plurality of peaks. In a discrete form, this three-dimensional data may take the form of a series or array of elements. In such an array, each element would include three values corresponding to the three dimensions of the contour.

In the various applications that incorporate the use of three-dimensional data, it may be desirable to determine peak summits, also referred to as "maxima" in the data. For example, in a manufacturing environment, numerical optimization methods are used to determine optimal values for process variables where closed form equations are not available to do so. According to the numerical optimization methods, process variables are adjusted incrementally while a property of the manufacture dependent on the variables is recorded. The combination(s) of process variables that produce the desired property of the manufacture may then be selected as optimal values for the particular process.

Illustrative of these methods, take for example a manufacturing process wherein a property of a manufactured product, such as thickness, varies depending on process variables, such as temperature and pressure. In the manufacturing process, both the temperature and pressure are maintained within predetermined ranges. Within these ranges, certain combinations of temperature and pressure produce an optimal, e.g., maximum, thickness in the product. In order to determine the temperature and pressure combination(s) that produce this maximum thickness, a three-dimensional array of data is recorded wherein temperature and pressure are represented in two of the dimensions and thickness is represented in the other dimension. Peak summits (i.e., maxima) in the thickness dimension can thus be associated with a particular combination of temperature and pressure.

Illustrative of another application that incorporates the use of three-dimensional data, the determination of peak summits in the data comprises a step in a process for determining the location of emitters of electromagnetic ("EM") radiation in a monitored area, such as a geographic area. Such an application may be desirable, for example, in a military or security setting. In this particular application, electromagnetic radiation data is collected simultaneously at a plurality of EM receiver platform sites having known locations in the monitored area.

Known methods for locating EM emitters determine the time difference of arrival ("TDOA") and/or frequency difference of arrival ("FDOA") of the electromagnetic radiation data collected at the EM receiver platforms. TDOA relates to the time shift in receiving the EM data at the various EM receiver platforms. TDOA results from, among other things, differences in the signal path length between the emitters and receivers and differences in signal propagation mediums. FDOA relates to a frequency shift or Doppler shift in the EM data received at the various EM receiver platforms. FDOA results from, among other things, movement of the emitters and/or receivers.

In the known methods, TDOA and/or FDOA data collected at two EM receiver platforms is used to generate three-dimensional data in the form of a contour representative of the EM radiation in the monitored area of interest. The number of generated contours can be increased by increasing the number of EM receivers used to collect the data. For example, if there are three EM receivers (e.g., receivers A, B, and C), a first surface can be generated using TDOA/FDOA data collected at receivers A and B, a second surface can be generated using TDOA/FDOA data collected at receivers B and C, and a third surface can be generated using TDOA/FDOA data collected at receivers A and C.

In the contours, time shift ($\tau$) and frequency shift ($v$) are typically represented on the horizontal axes and the magnitude of the detected electromagnetic radiation is represented on the vertical axis. If there is no FDOA (i.e., if the emitters and receivers are stationary), then the frequency shift ($v$) is zero. "Peaks" on the contour having an EM radiation level above a predetermined threshold are determined to be indicative of EM emitters. The predetermined threshold is determined as a function of factors such as electromagnetic noise levels in the monitored area. Electromagnetic noise is a function of a variety of factors, such as the number of EM emitters in the monitored area of interest.

In this particular application, the locations of the EM emitters are associated with the peak summits on the contour. Once the location of the peak summit is determined, the time shift $\tau$ and frequency shift $v$ associated with that location is recorded. This data is used to generate curves indicative of constant time and/or frequency paths for each potential emitter. Thus, in the example set forth above, three sets of curves (one for each of contours A–B, B–C, and C-A) would be calculated. In each set of curves, there would be a constant time/frequency path curve for each EM emitter. In order to determine the EM emitter locations, curves calculated using data from two of the contours (e.g., contours A–B and B-C) are compared to determine where the curves intersect. These intersections indicate potential EM emitter locations.

The peak summits on the contour are typically located using known numerical search and estimation techniques. In one such known technique, numerical searches are conducted from starting points that are adjusted incrementally over the contour to determine if the starting point is a peak summit. For several reasons, however, these methods are inefficient and can lead to inaccurate results. One source of inefficiency stems from the fact that these methods perform multiple iterations of the search routine on the same data. Other inefficiencies and/or inaccuracies depend on the selection of the step size of the increments and the starting point of the routine. If the step size is too large, peak summits and even entire peaks can be missed completely, thus producing an incomplete solution set. If the step size is too small, peak summits may be found multiple times, and thus may require an unacceptably high processing capacity or produce a slow processing time.

These inefficiencies are compounded where there are a multiple peaks on the contour and where there is a large three-dimensional data space to analyze. Factors such as noise levels in the monitored area can further complicate the process. Such complexity is undesirable for obvious reasons, such as processing speed, system expense, etc.

SUMMARY OF THE INVENTION

The present invention is directed to a system and method for determining locations of peak summits in three-dimensional data. According to the present invention, a numerical search technique is used to determine the location of the peak summits in a manner that is both efficient and accurate. This is done by performing a numerical search for maximum values ("maxima") in the data, analyzing data surrounding the maxima to determine which points are included in the peak, recording the peak summit location as the location of the maxima, and then zeroing out all of the data points associated with the peak. This process is repeated until all of the peaks having a magnitude above a predetermined threshold are located.

According to one aspect of the present invention, a method for determining peak summit locations for multiple peaks on a three-dimensional contour includes the step of determining a highest point on the contour. Next, a peak summit of a peak on the contour is identified. The peak summit is related to the highest point on the contour. Next, the points on the contour associated with the peak on the contour are determined, and the contour is modified to zero out the points on the contour associated with the peak. The above steps are then repeated until all of the peak summits on the contour are identified.

According to another aspect of the present invention, a computer product is operative to determine peak summit locations for multiple peaks on a three-dimensional contour represented by a discrete array of data elements each having a magnitude and location. The computer product includes a portion for determining a data element having the highest magnitude in the array. The computer product also includes a portion for identifying a data element in the array, related to the highest magnitude data element, which is representative of a peak summit of a peak on the contour. The computer product further includes a portion for determining data elements in the array representative of the peak on the contour. The computer product finally includes a portion for modifying the array to zero out the data elements representative of the peak. The computer product is operative to iterate through the above portions until all of the data elements in the array representative of a peak summit are identified.

BRIEF DESCRIPTION OF THE DRAWINGS

The foregoing and other features and advantages of the present invention will become apparent to those skilled in the art to which the present invention relates upon reading the following description with reference to the accompanying drawings, wherein:

FIG. 2 is a high-level functional block diagram of a process for determining peak summit locations on the contour of FIG. 1, in accordance with an example embodiment of the present invention;

FIGS. 3A–3D are functional block diagrams illustrating details of portions of the process of FIG. 2;

DESCRIPTION OF AN EXAMPLE EMBODIMENT

Figure 1:
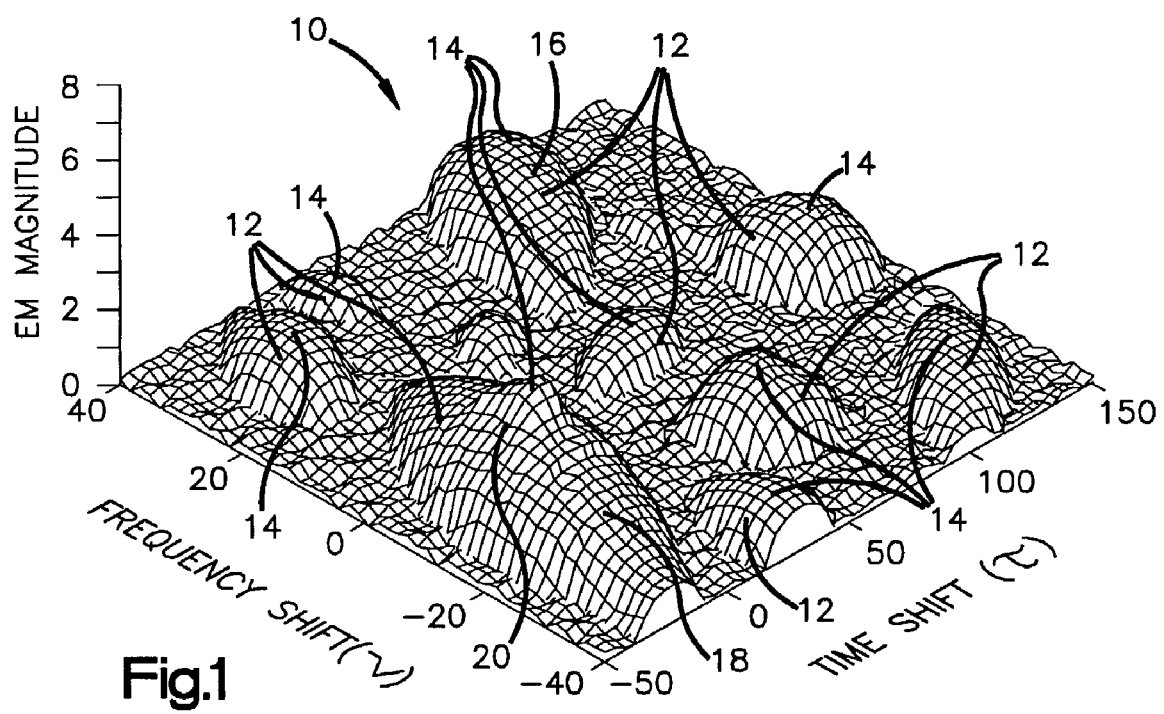
FIG. 1 illustrates an example of a contour which is analyzed in accordance with the present invention.

The field of the present invention relates to evaluating three-dimensional data. Three-dimensional data includes elements, each of which include three values. Three-dimensional data often comprises an array of these three-dimensional elements. An array of three-dimensional data may be illustrated by plotting the data on a three-dimensional coordinate system.

Each axis (e.g., X, Y, Z) of the three-dimensional coordinate system corresponds to a respective one of the values in the three-dimensional elements. An array of three-dimensional data thus may define a three-dimensional contour in the coordinate system. In such a contour, the discrete elements of the array are represented by points on the contour plotted from the data in the array. Portions of the contour located between these discretely plotted points may be interpolated from the surrounding data. The resolution or smoothness of the contour is thus dependent upon how densely the elements are arranged on the contour. Conversely, a three-dimensional contour may consist of non-discrete data which forms the contour. Discrete data can be extracted from the contour by known means, such as sampling, and arranged in an array of discrete elements. Each of these discrete elements would include discrete values corresponding to the three-dimensional characteristics of a corresponding point on the contour.

In a three-dimensional contour, one or more elements may form what may be referred to as a "peak" on the contour. A peak appears as a point or group of points that are elevated or extend beyond other surrounding points in the direction of one of the axes of the coordinate system. Since these coordinate systems are typically arranged with two axes (e.g., X & Y axes) lying on a horizontal plane and one axis (e.g., Z axis) extending vertically, peaks are typically represented as vertically extending groups of points on the contour. The highest point on any particular peak on the contour may be referred to as the "summit" of the peak. The location of the summit on the contour refers to the horizontal coordinates, i.e., X & Y coordinates, associated with the summit.

The present invention relates to a system and method for determining the location of peak summits on three-dimensional contours. The present invention thus may be embodied as a computer program compilable to provide a computer product (i.e., program) executable to determine the location of peak summits on three-dimensional contours. The system and method of the present invention is suited for implementation on a computer system or the like that is suited to process the discrete arrays of data representative of a three-dimensional contour. These discrete arrays may be determined from the non-discrete data of the three-dimensional contour in any suitable manner not inconsistent with the teachings provided herein.

In an example embodiment of the present invention, a system and method determines the locations of peak summits in three-dimensional data to help determine the location of emitters of electromagnetic ("EM") radiation. An example of EM emitter location determination is described in co-pending U.S. patent application Ser. No. 10/213,708, entitled "SYSTEM AND METHOD FOR LOCATING EMITTERS," and is hereby fully incorporated by reference.

Those skilled in the art will appreciate that the present invention may be adapted to determine locations of peak summits in three-dimensional data in a variety of applications other than the determination of EM emitter locations.

Such applications include numerical optimization methods that may be applied or otherwise incorporated in a manufacturing or other industrial process.

The example embodiment of the present invention is described herein in the context of determining the location of emitters of electromagnetic ("EM") energy. In determining the location of EM emitters, EM receivers monitor EM energy in an area of interest and record EM data. The recorded EM data is non-discrete three-dimensional data wherein one axis represents an EM energy magnitude and the other two axes represent a time shift ($\tau$) and a frequency shift ($v$), respectively, associated with the EM energy magnitude.

FIG. 1 illustrates a contour 10 representative of non-discrete EM radiation data sampled by EM receivers. According to the example embodiment of FIG. 1, the contour 10 has first and second axes representative of time shift ($\tau$) and frequency shift ($v$), respectively, and a third axis representative of measured EM radiation magnitude. Any point on the contour 10 may thus be associated with a measured EM radiation magnitude and a corresponding time shift ($\tau$) and frequency shift ($v$). The contour 10 includes a plurality of peaks 12, each of which has a summit 14. The summit 14 is the data point having the highest EM radiation magnitude out of all of the points associated with its respective peak 12. The location of the summit, as referred to in this description of an example embodiment, is meant to refer to the time shift ($\tau$) and frequency shift ($v$) values associated with the EM radiation magnitude at the summit 14.

Those skilled in the art will appreciate that there may be EM noise in the monitored area. Referring to the contour 10 of FIG. 1, this EM noise is indicated by the general "roughness" of the contour. The level of EM noise, i.e., the roughness of the contour 10 may vary greatly depending on a variety of factors, such as the number of EM emitters in the monitored area. Therefore, in order to identify a peak 12 associated with an emitter of EM radiation on the contour 10, the emitter must produce EM radiation having a magnitude that exceeds a threshold level determined by the amount of EM noise in the monitored area.

In FIG. 1, certain peaks 12 on the contour 10 are indicative of detected EM radiation having a magnitude that exceeds the EM noise level of the monitored area. These peaks 12 may be associated with EM emitters in the monitored area if the EM radiation indicated by a particular peak exceeds the threshold level. According to the present invention, a system and method are provided for determining the location of peak summits 14 on the contour 10 and thereby determining the phase shift $v$ and time shift $\tau$ associated with the peak summits.

As stated above, the contour 10 is a graphical representation of non-discrete three-dimensional data. This graphical representation may be generated by means (not shown) such as a computer or other suitable device. The computer may also analyze the data in order to determine the peaks 12 and the locations of the peak summits 14. It will be appreciated, however, that such a computer does not require graphical generation of the contour 10 in order to analyze the data. This function may be performed in any suitable manner without departing form the spirit of the present invention. For example, analysis of the data described herein may performed completely in computer memory, without generating any graphical representation of the data.

FIG. 2 is a high-level flow diagram illustrating a process 30 for determining the locations of peak summits 14 in an array of discrete data elements representative of the contour illustrated in FIG. 1. In this description of an example embodiment, the use of the word "step" is used to describe functions performed during the process 30.

The process 30 begins at step 32 and proceeds to step 34. At step 34, the data elements are analyzed to determine the highest peak summit in the array. Once the highest peak summit is determined, the process 30 proceeds to step 36, where a determination is made as to whether the peak summit determined at step 34 is above a predetermined threshold magnitude. If the peak summit is not above the threshold, the process 30 proceeds to step 50 and ends.

If the peak summit is above the threshold, the process 30 proceeds to step 40 where the actual location of the peak summit determined at step 34 is determined. The process 30 then proceeds to step 42, where the peak is tested for symmetry and the locations of any multiple peak summits are determined and recorded. The process 30 then proceeds to step 44, where the magnitude of the data elements associated with the peak are zeroed out. The process 30 then proceeds to step 46 where the array of data elements, modified at step 44 to zero out the previously determined peak, is returned back to step 34. The process 30 then begins another iteration, determining the highest peak summit in the modified array.

It will be appreciated that, according to the process 30 of FIG. 2, the locations of peak summits are determined by systematically determining the location of the data point with the highest magnitude (i.e., peak summit), recording this location as a peak summit location, and then zeroing out the magnitude all of the data points associated with the entire peak. Zeroing out the data points associated with the entire peak eliminates the peak from consideration in any subsequent iterations of the process 30. This helps eliminate a variety of problems that may be encountered, such as finding the same peak twice. The process 30 continues to iterate until all of the peak summits having a magnitude a predetermined threshold are located.

FIG. 3A illustrates a process 60 that details the functions performed at step 34 in FIG. 2. The process 60 determines the highest peak summit in the array of discrete data elements represented by the contour 10 of FIG. 1. The process 60 begins at step 62 and proceeds to step 64, where the discrete data elements are received. As indicated in FIG. 3A, the data elements may be in the form of $s_n(v,\tau)$, where $s_n$ represents the magnitude associated with the $n^{th}$ data element, $v$ represents the frequency shift associated with the data element, and $\tau$ represents the time shift associated with the data element. Each magnitude $s_n$ in the array may thus be associated with a respective time shift $\tau$ and frequency shift $v$. Once the discrete data elements are received, the process 60 proceeds to step 66.

At step 66, the data elements are stepped through systematically to find the element having the highest magnitude $s_n$. It will be appreciated that the highest magnitude $s_n$ in the data may be determined by any other suitable manner. For example, the data elements may be stepped through sequentially (e.g., top to bottom and left to right in the array) to find the highest magnitude $s_n$ and its associated time shift $\tau$ and frequency shift $v$. Alternatively, the time shift $\tau$ and frequency shift $v$ values of the data elements in the array may be stepped through sequentially to determine the data element having the highest magnitude $s_n$.

Once the element having the highest magnitude $s_n$ and its associated frequency step $v$ and time step $\tau$ are determined, the process 60 proceeds to step 70, where these values are recorded. The process 60 then proceeds to step 72, where the data element $s_n(v,\tau)$ is provided to step 36 in the process 30 of FIG. 2. The process 60 of FIG. 3A then ends at step 74.

Referring back to FIG. 2, at step 36, a determination is made as to whether the peak summit determined at step 34, i.e., the magnitude $s_n$ from step 72 (FIG. 3A), is above a predetermined threshold magnitude. This threshold magnitude is determined as a function of EM noise levels in the monitored area. If the magnitude $s_n$ exceeds the threshold magnitude, the process 30 proceeds to step 40.

FIG. 3B illustrates a process 80 that details the functions performed at step 40 in FIG. 2. The process 80 determines which the actual location of the peak summit indicated by the highest magnitude data element $s_n(v,\tau)$ determined in the process 60 of FIG. 3A. The process 80 begins at step 82 and proceeds to step 84, where the highest magnitude data element $s_n(v,\tau)$ is received from step 72 in FIG. 3A. The process 80 then proceeds to step 86.

At step 86, a two dimensional curve fit is performed to determine the actual location of the peak summit indicated by the highest magnitude data element $s_n(v,\tau)$ of step 84. This is done because the actual peak summit may be located "between" the discrete data elements $s_n(v,\tau)$ in the array. This may especially be the case where the resolution of the array is low, such as where a large area of interest is monitored. For example, a monitored area of hundreds or thousands of square kilometers may produce an array wherein each data element represents hundreds of square meters or more. Thus, it will be appreciated that it may be necessary to determine an actual peak summit location based on the magnitudes of the data elements $s_n(v,\tau)$ surrounding the highest magnitude data element identified at step 84.

According to the present invention, the actual peak summit location may be determined at step 86 by any suitable manner known in the art. For example, as illustrated in FIG. 3B, the location of the peak summit may be determined using a two-dimensional surface curve fit algorithm, such as a least squares algorithm. Such an algorithm would estimate the actual peak summit location based on the magnitudes of the data elements surrounding the highest magnitude data element of step 84. Alternative algorithms, such as center-of-mass calculations and/or interpolation may also be incorporated at step 86 to determine the actual peak summit location.

Those skilled in the art will appreciate that, depending on the resolution of the data elements in the array and/or the required accuracy of the peak summit determination process 30, it may not be necessary to determine the actual peak summit location in accordance with step 86. In this instance, the peak summit location may be determined to be indicated by the highest magnitude data element $s_n(v,\tau)$ of step 84.

Once the actual location of the actual peak summit is determined, the process 80 proceeds to step 90, where the actual peak location data is provided to the symmetry analysis of step 42 in FIG. 2. The process 80 of FIG. 3B then ends at step 92.

Figure 3D:
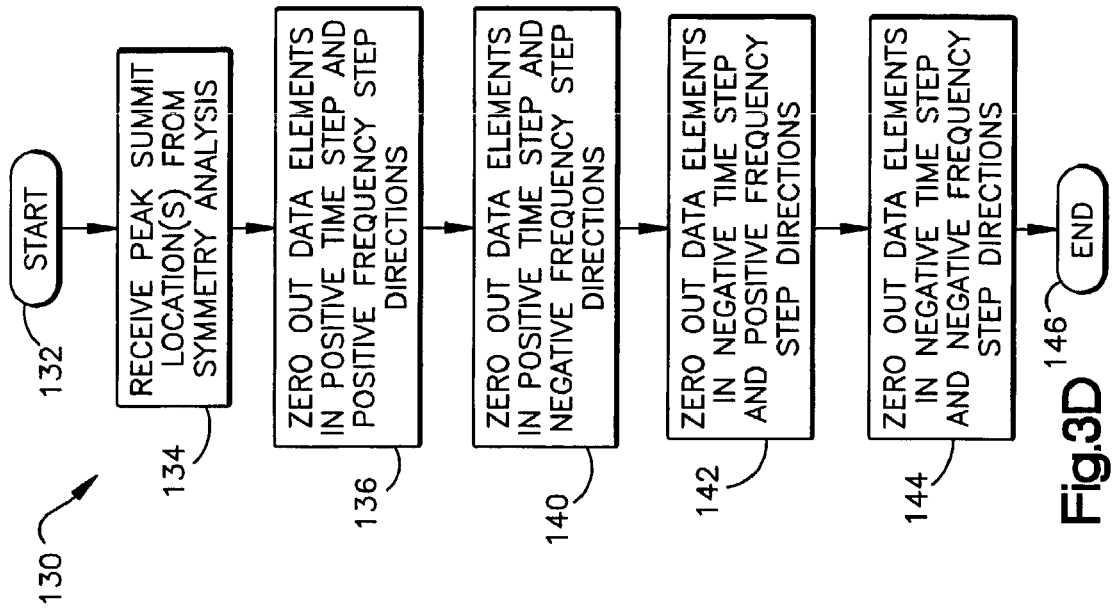
Figure 3C:
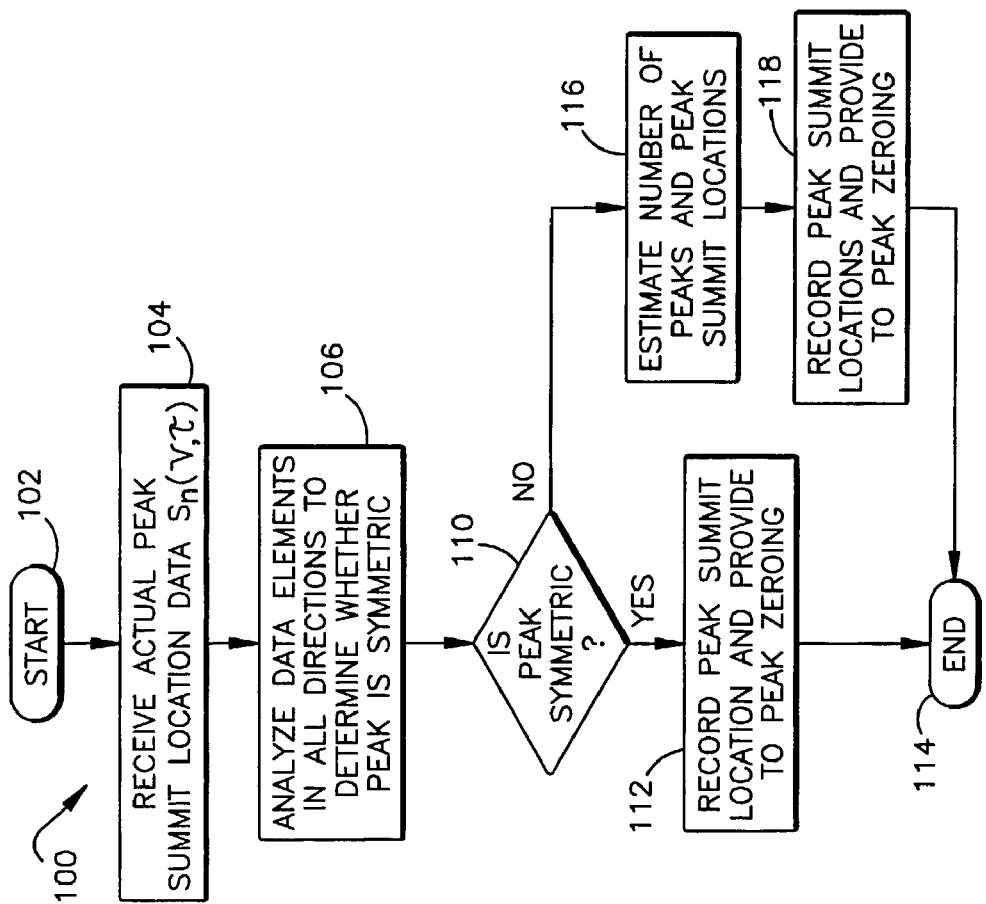

FIG. 3C illustrates a process 100 that details the functions performed at step 42 in FIG. 2. The process 100 analyzes the data elements surrounding the actual peak summit location determined in step 86 in FIG. 3B to determine if the peak surrounding the actual peak summit is symmetric. This is done to help determine whether the peak is created by a single EM emitter or by a combination of EM emitters. If the slope at which the peak extends from the peak summit is generally equal in all directions, then a single EM emitter is indicated at the actual location received at step 104. If, however, the slope at which the peak extends from the peak summit is not equal in all directions, then multiple EM emitters are indicated and the actual location received at step 104 may be inaccurate or invalid. It is therefore desirable to determine whether the peak is symmetric.

By symmetric, it is meant that the peak descends from the peak summit at a generally equal/uniform slope or gradient from the peak summit. Put another way, by symmetric, it is meant that the peak is generally symmetric with respect to an axis extending through the peak summit and perpendicular to the frequency shift $v$ and time shift $\tau$ axes. To illustrate, referring to FIG. 1, the peak 12 identified at 16 are symmetric, whereas the peak identified at 18 is asymmetric.

The process 100 begins at step 102 and proceeds to step 104, where the actual peak location data element $s_n(v,\tau)$ is received from step 90 in FIG. 3B. The process 100 then proceeds to step 106 where the data elements in the array are analyzed in all directions from the actual peak location to determine if the peak is symmetric. This may be done in any suitable manner such as by stepping through the surrounding data elements in the positive and negative directions of frequency step $v$ and time step $\tau$. As the data elements are stepped through, an algorithm is performed to determine the slope or gradient of the peak in each direction from the peak summit. The process 100 then proceeds to step 110.

If the peak is determined to be symmetric, then a single EM emitter is indicated at the actual peak summit location received at step 104. In this instance, the process 100 proceeds to step 112, where the data element $s_n(v,\tau)$ associated with the peak summit location is recorded and provided to the peak zeroing step 44 in the process 30 of FIG. 2. The process 100 then ends at step 114.

Figure 4:
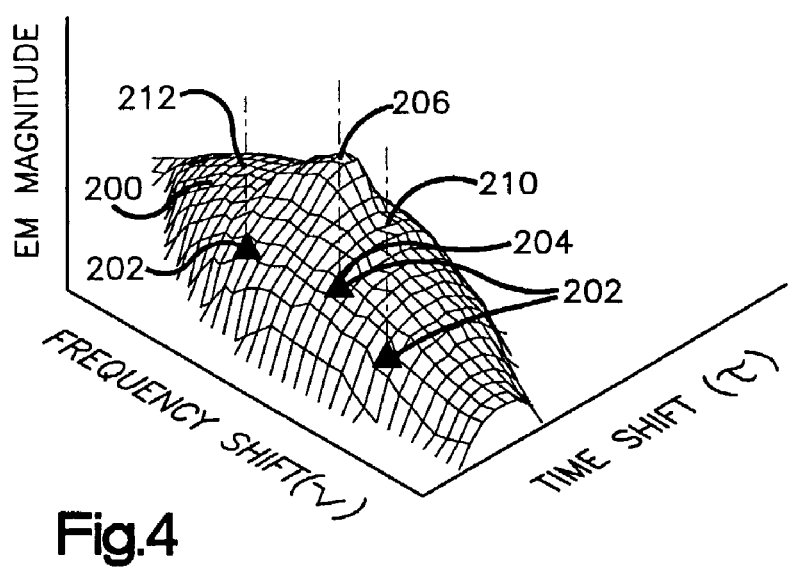
FIG. 4 illustrates a contour representative of a portion of the contour of FIG. 1.

If the peak is determined to be asymmetric, then multiple EM emitters are indicated, and the actual location received at step 104 may be inaccurate or invalid. In this instance, the process 100 proceeds to step 116, where the number of peaks and their respective locations are estimated. This is best illustrated in reference to FIG. 4. In FIG. 4, an asymmetric peak 200 is created by three separate EM emitters 202. In this example, one of the EM emitters, indicated at 204, produces EM radiation having a magnitude higher than the other two emitters. Thus, in this example, the peak summit location received at step 104 in FIG. 3C would be the peak summit indicated at 206 in FIG. 4. As shown in FIG. 4, in this instance, the peak summit received at step 104 in FIG. 3C is accurate. In actuality, however, the peak 200 (FIG. 4) is formed by the presence of all three of the EM emitters 202. If it is assumed that the peak 200 is a result of a single EM emitter located at the peak summit 206, without analyzing the symmetry of the peak, then identification of the remaining EM emitters may be jeopardized.

At step 116 of the process 100, the number of peaks and the peak locations are estimated in a manner similar to the manner in which symmetry of the peak is determined at step 106. At step 116 an algorithm is performed to determine locations on the peak where drastic or unexpected changes in slope or gradient occur. The estimated peak summit locations are determined where these changes in slope or gradient are the greatest. For example, the peak 200 (FIG. 4) has a steep slope as it descends from the summit 206. It would be expected that, in a peak formed by a single EM emitter, this slope would remain generally constant. The slope of the peak 200, however, flattens out in the areas identified generally at 210 and 212 in FIG. 4, which coincides with the location of the remaining two EM emitters 202. The peak 200 then has a steep slope as it descends from the locations 210 and 212. The algorithm of step 116 would seek out these variations (e.g., via curve fit, numerical search, etc.) and estimate the location of the EM emitters that cause the change in slope of the peak in the areas 210 and 212.

Once the estimated peak summit locations are determined, the process 100 proceeds to step 118, where the estimated peak summit locations are recorded and provided to the peak zeroing step 44 in the process 30 of FIG. 2. The process 100 of FIG. 3C then ends at step 114.

FIG. 3D illustrates a process 130 that details the functions performed at step 44 in FIG. 2. The process 130 zeroes out the data elements included in the peak for which the peak summit location(s) were recorded at steps 112 and 118 in FIG. 3C. This is done to remove the data elements $s_n(v,\tau)$ associated with the peak from consideration in successive iterations of the process 30 (FIG. 2). Advantageously, this eliminates the need to store the identity of all data elements associated with an identified peak so that a comparison can be made in successive iterations in order to avoid duplicate peak identification. This simplification helps reduce the number and complexity of calculations made in the process 30, which is desirable for a number of reasons (efficiency, cost, etc.).

The process 130 begins at step 132 and proceeds to step 134, where the peak summit location data element $s_n(v,\tau)$ is received from step 112 or 118 in FIG. 3C. The process 130 then proceeds to step 136. At step 136, the data elements in the array are stepped through in the positive time step $\tau$ and positive frequency step $v$ directions. If the data elements at each of these steps indicate a downward slope, they are determined to be included in the peak associated with the peak summit and their magnitudes are set to zero in the data array. This step ends when the data elements descend into the noise level magnitudes or when the data elements indicate an increasing slope, which indicates that the element belongs to another peak. The process 130 then proceeds to step 140.

At step 140, the data elements in the array are stepped through in the positive time step $\tau$ and negative frequency step $v$ directions. If the data elements at each of these steps indicate a downward slope, they are determined to be included in the peak associated with the peak summit and their magnitudes are set to zero in the data array. This step ends when the data elements descend into the noise level magnitudes or when the data elements indicate an increasing slope, which indicates that the element belongs to another peak. The process 130 then proceeds to step 142.

At step 142, the data elements in the array are stepped through in the negative time step $\tau$ and positive frequency step $v$ directions. If the data elements at each of these steps indicate a downward slope, they are determined to be included in the peak associated with the peak summit and their magnitudes are set to zero in the data array. This step ends when the data elements descend into the noise level magnitudes or when the data elements indicate an increasing slope, which indicates that the element belongs to another peak. The process 130 then proceeds to step 144.

At step 144, the data elements in the array are stepped through in the negative time step $\tau$ and negative frequency step $v$ directions. If the data elements at each of these steps indicate a downward slope, they are determined to be included in the peak associated with the peak summit and their magnitudes are set to zero in the data array. This step ends when the data elements descend into the noise level magnitudes or when the data elements indicate an increasing slope, which indicates that the element belongs to another peak.

The process 130 of FIG. 3D ends at step 146. The array of data elements including the zeroed out elements from the process 130 is provided to step 46 (FIG. 2), which returns the array to step 34 for the next iteration of the process 30. The process 30 then proceeds as described herein above to identify and zero out the next highest peak in the array of data elements. The process 30 ends when there are no remaining peaks that extend above the noise threshold. The process 30 thus provides a solution set of EM radiation magnitudes and their associated time shift $\tau$ and frequency shift $v$ values that can be used to determine the location of the EM emitters producing the EM radiation.

Figure 5A:
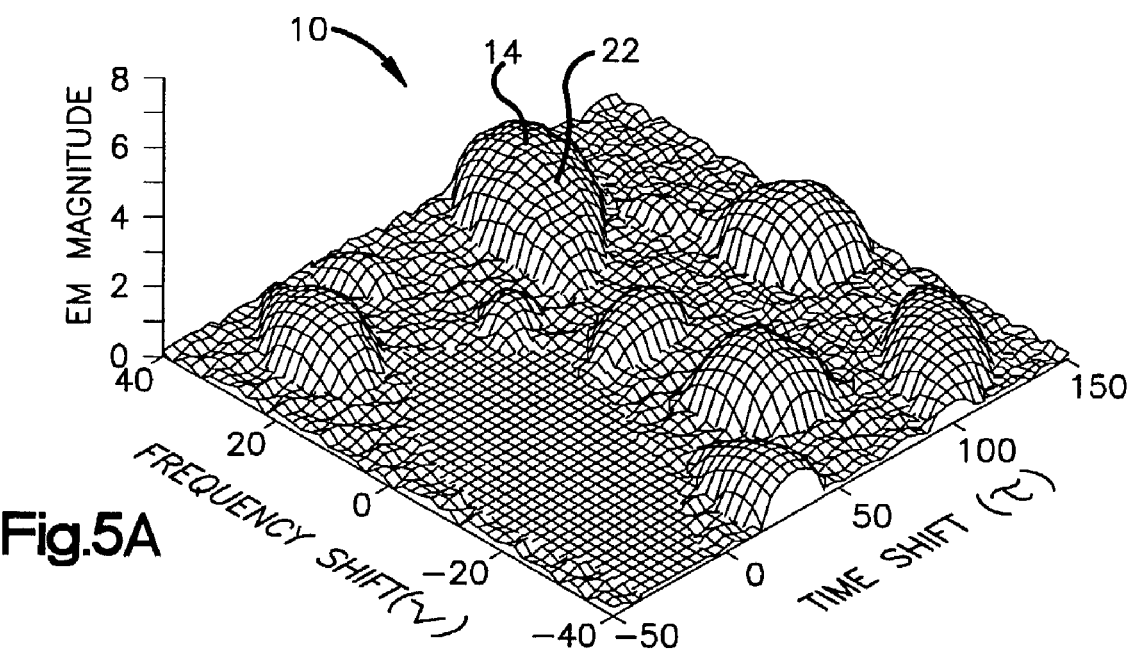
FIGS. 5A–5E illustrate the contour of FIG. 1 at various steps during the process for determining peak summit locations, in accordance with an example embodiment of the present invention.

FIGS. 5A–5E illustrate the contour 10 of FIG. 1 after successive iterations of the process 30 of FIG. 2. In the first iteration of the process 30, the peak 12 on the contour 10 having the highest magnitude peak summit 14 is identified. This highest peak is identified at 20 in FIG. 1. The process then determines the actual location of the peak summit 14 of the highest peak 20 and records the associated frequency step $v$ and time step $\tau$. The process then determines whether the highest peak 20 is symmetric, determines (estimates) and records any multiple peak summits of an asymmetric peak, and zeroes out the data elements associated with the highest peak. This is illustrated in FIG. 5A.

Referring to FIG. 5A, the portion of the contour where the highest peak 20 was located has been zeroed out. In the example embodiment of the present invention, this is accomplished by setting the magnitude $s_n$ of the discrete data elements $s_n(v,\tau)$ in the array associated with the highest peak 20 to zero. A second iteration of the process 30 is then performed on the modified array having data elements $s_n(v,\tau)$ representative of the contour of FIG. 5A.

In the second iteration of the process 30, the peak 12 on the contour 10 having the highest magnitude peak summit 14 is identified. This peak is the second highest peak from the original contour 10 (FIG. 1). This second highest peak is identified at 22 in FIG. 5A. The process then determines the actual location of the peak summit 14 of the second highest peak 22 and records the associated frequency step $v$ and time step $\tau$. The process then determines whether the second highest peak 22 is symmetric, determines (estimates) and records any multiple peak summits of an asymmetric peak, and zeroes out the data elements associated with the highest peak. This is illustrated in FIG. 5B.

Figure 5B:
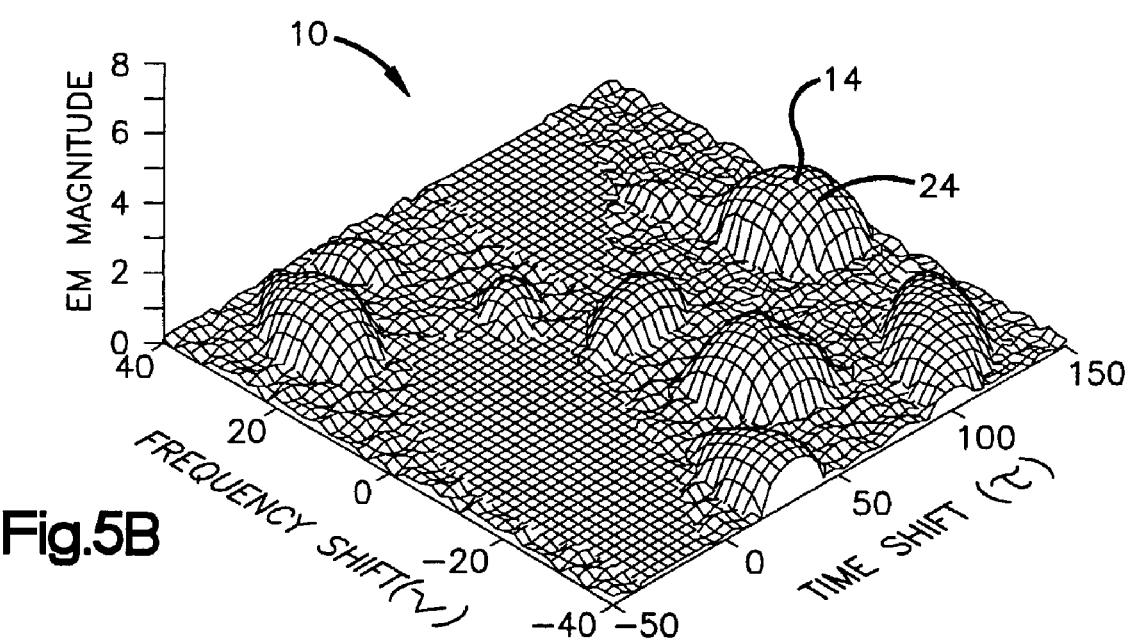

Referring to FIG. 5B, the portion of the contour where the second highest peak 22 was located has been zeroed out. In the example embodiment of the present invention, this is accomplished by setting the magnitude $s_n$ of the discrete data elements $s_n(v,\tau)$ in the array associated with the second highest peak 22 to zero.

Figure 5C:
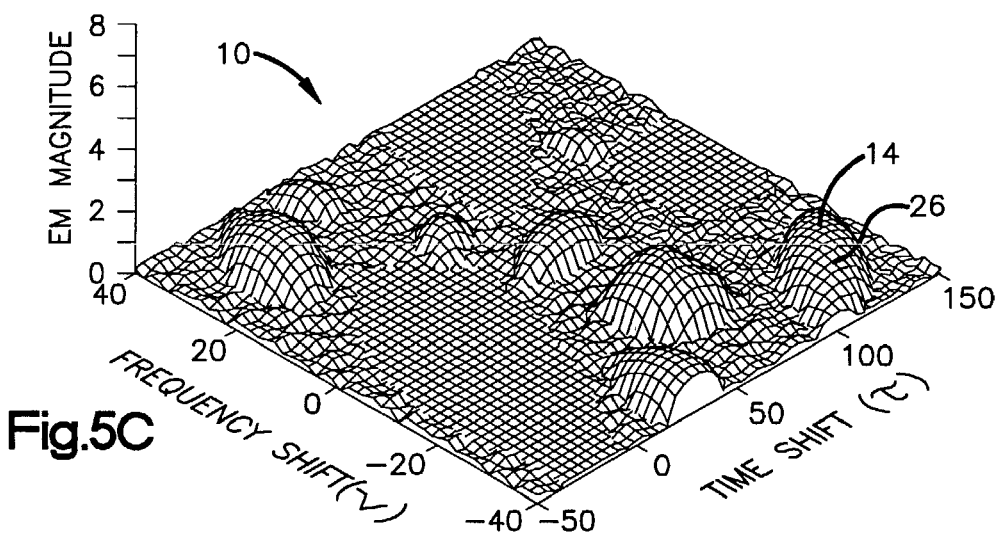
Figure 5D:
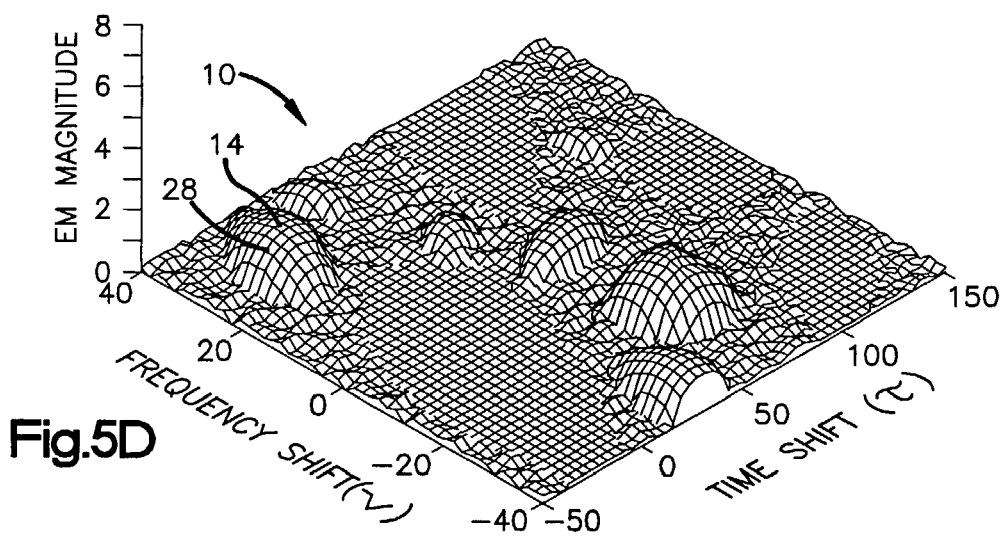
Figure 5E:
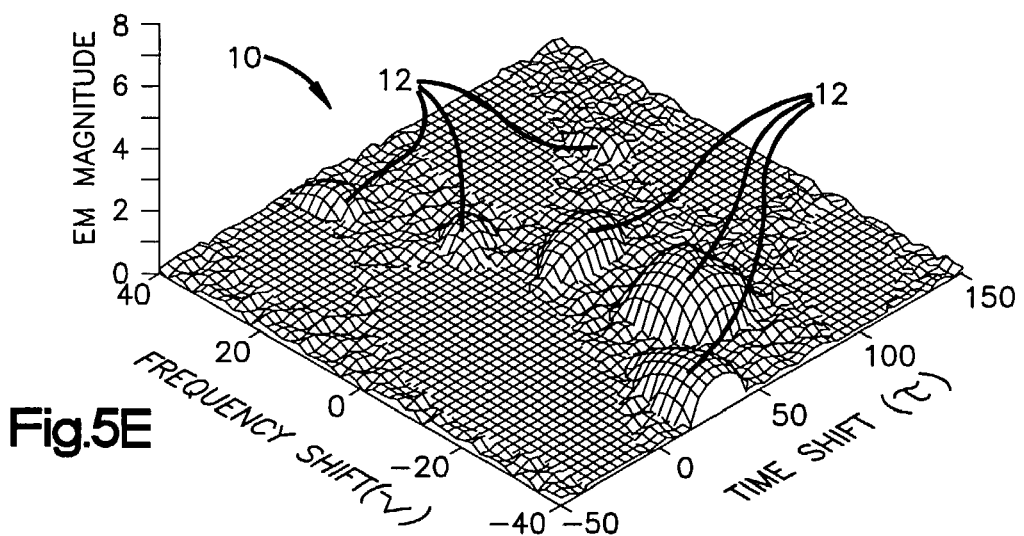

The process 30 continues to iterate until all peak summits 14 on the contour 10 having a magnitude above the predetermined threshold are identified. This is illustrated in FIGS. 5C–5E, respectively. In FIG. 5C, a third highest peak 24 (FIG. 5B) has had its peak summit 14 identified and has been zeroed out. In FIG. 5D, a fourth highest peak 26 (FIG. 5C) has had its peak summit 14 identified and has been zeroed out. In FIG. 5E, a fifth highest peak 28 (FIG. 5D) has had its peak summit 14 identified and has been zeroed out. At this point, the process 30 ends because all of the remaining peaks 12 (FIG. 5E) have a magnitude below the predetermined threshold.

From the above description of the invention, those skilled in the art will perceive improvements, changes and modifications. While the present invention has been described in the illustrated embodiment as it pertains to the location of EM emitters, it will be appreciated that the peak determination system and method of the present invention may be incorporated into any application where it is desirable to determine the location of peak summits (maxima) in three-dimensional data. Such improvements, changes and modifications within the skill of the art are intended to be covered by the appended claims.

Having described the invention, the following is claimed:

1. A computerized method for determining peak summit locations in data collected via one or more sensors and quantified as a three-dimensional contour having multiple peaks, said method comprising the steps of:
   determining a highest point on the contour;
   identifying a peak summit of a peak on the contour, said peak summit being related to said highest point on the contour;
   determining points on the contour associated with said peak on the contour;
   modifying said contour to zero out said points on the contour associated with said peak on the contour; and
   repeating the above steps until all of the peak summits on the contour are identified.

2. The method recited in claim 1, wherein said step of identifying a peak summit comprises the step of determining an actual peak summit location using a curve fit algorithm performed on points surrounding said determined highest point.

3. The method as recited in claim 2, further comprising the steps of:
   determining whether said peak on the contour is symmetric with respect to said actual peak summit location;
   determining that said peak comprises a plurality of combined peaks when said peak is determined to be asymmetric with respect to said actual peak summit location; and
   estimating a peak summit location for each of said combined peaks when said peak is determined to be asymmetric with respect to said peak summit.

4. The method as recited in claim 3, wherein said step of modifying said contour further comprises the step of zeroing out points on the contour associated with said combined peaks on the contour.

5. The method recited in claim 1, wherein said step of identifying a peak summit comprises the step of identifying said determined highest point as an actual peak summit.

6. The method recited in claim 1, wherein said step of identifying points on the contour associated with said peak comprises the step of identifying points on the contour that slope downward from said peak summit.

7. A computerized method for determining peak summit locations in data collected via one or more sensors and quantified as a three-dimensional contour having multiple peaks, the contour being represented by a discrete array of data elements each having a magnitude and location, said method comprising the steps of:
   determining a data element having the highest magnitude in the array;
   identifying a data element in said array representative of a peak summit of a peak on the contour, said data element representative of a peak summit being related to said highest magnitude data element;
   determining data elements in said array representative of said peak on the contour;
   modifying said array to zero out said data elements representative of said peak; and
   repeating the above steps until all of the data elements in said array representative of a peak summit are identified.

8. The method recited in claim 7, wherein said step of identifying a data element representative of a peak summit comprises the step of determining an actual peak summit location using a curve fit algorithm performed on data elements surrounding said data element having the highest magnitude.

9. The method as recited in claim 8, further comprising the steps of:
   determining whether said data elements representative of said peak are symmetric with respect to said actual peak summit location;
   determining that said peak comprises a plurality of combined peaks when said data elements representative of said peak are determined to be asymmetric with respect to said actual peak summit location; and
   estimating a peak summit location for each of said combined peaks when said peak is determined to be asymmetric with respect to said actual peak summit location.

10. The method as recited in claim 9, wherein said step of modifying said array further comprises the step of zeroing out data elements in said array associated with said combined peaks.

11. The method recited in claim 7, wherein said step of identifying a data element representative of a peak summit comprises the step of identifying said data element having the highest magnitude as an actual peak summit.

12. The method recited in claim 7, wherein said step of determining data elements in said array representative of said peak on the contour comprises the step of identifying data elements in said array representative of points on the contour that slope downward from said data element representative of a peak summit.

13. A system including an associated processor for executing instructions to determine peak summit locations in data collected via one or more sensors and quantified as a three-dimensional contour having multiple peaks, the contour being represented by a discrete array of data elements each having a magnitude and location, said system comprising:
   a portion for determining a data element having the highest magnitude in the array;
   a portion for identifying a data element in said array representative of a peak summit of a peak on the contour, said data element representative of a peak summit being related to said highest magnitude data element;
   a portion for determining data elements in said array representative of said peak on the contour;
   a portion for modifying said array to zero out said data elements representative of said peak, said computer product being operative to iterate through the above portions until all of the data elements in said array representative of a peak summit are identified; and
   identifying said peak summits as potential emitter locations in the monitored area.

14. The system recited in claim 13, wherein said portion for identifying a data element representative of a peak summit comprises a portion for determining an actual peak summit location using a curve fit algorithm performed on data elements surrounding said data element having the highest magnitude.

15. The system as recited in claim 14, further comprising:
   a portion for determining whether said data elements representative of said peak are symmetric with respect to said actual peak summit location;

a portion for determining that said peak comprises a plurality of combined peaks when said data elements representative of said peak are determined to be asymmetric with respect to said actual peak summit location; and a portion for estimating a peak summit location for each of said combined peaks when said peak is determined to be asymmetric with respect to said actual peak summit location.

16. The system as recited in claim 15, wherein said portion for modifying said array further comprises a portion for zeroing out data elements in said array associated with said combined peaks.

17. The system as recited in claim 13, wherein said portion for identifying a data element representative of a peak summit comprises a portion for identifying said data element having the highest magnitude as an actual peak summit.

18. The system recited in claim 13, wherein said portion for determining data elements in said array representative of said peak on the contour comprises a portion for identifying data elements in said array representative of points on the contour that slope downward from said data element representative of a peak summit.

* * * * *